United States Patent
Troesch et al.

(10) Patent No.: US 10,934,132 B2
(45) Date of Patent: Mar. 2, 2021

(54) LIFT SYSTEM WITH PREDICTIVE CALL PRODUCTION

(71) Applicant: Inventio AG, Hergiswil (CH)

(72) Inventors: Florian Troesch, Zurich (CH); Paul Friedli, Remetschwil (CH)

(73) Assignee: Inventio AG

( * ) Notice: Subject to any disclaimer, the term of this patent is extended or adjusted under 35 U.S.C. 154(b) by 503 days.

(21) Appl. No.: 15/571,007

(22) PCT Filed: Jun. 9, 2016

(86) PCT No.: PCT/EP2016/063212
§ 371 (c)(1),
(2) Date: Oct. 31, 2017

(87) PCT Pub. No.: WO2016/198548
PCT Pub. Date: Dec. 15, 2016

(65) Prior Publication Data
US 2018/0162688 A1 Jun. 14, 2018

(30) Foreign Application Priority Data
Jun. 10, 2015 (EP) .................................... 15171297

(51) Int. Cl.
*B66B 1/46* (2006.01)
*G05B 15/02* (2006.01)
(52) U.S. Cl.
CPC .............. *B66B 1/468* (2013.01); *G05B 15/02* (2013.01); *B66B 2201/4615* (2013.01); *B66B 2201/4653* (2013.01); *G05B 2219/25186* (2013.01); *G05B 2219/2642* (2013.01); *G05B 2219/2659* (2013.01)

(58) Field of Classification Search
CPC ............ B66B 1/468; B66B 2201/4651; B66B 2201/4653; G05B 15/02; G05B 2219/2518; G05B 2219/2642; G05B 2219/2659
USPC ........................................................ 187/380
See application file for complete search history.

(56) References Cited

U.S. PATENT DOCUMENTS

| 9,448,273 B2 * | 9/2016 | Kattainen | G05B 15/02 |
| 10,114,066 B2 * | 10/2018 | Kattainen | G05B 15/02 |
| 2002/0036122 A1 * | 3/2002 | Fayette | B66B 3/00 187/391 |

(Continued)

FOREIGN PATENT DOCUMENTS

| EP | 1189830 B1 | 10/2003 |
| EP | 1761451 A2 | 3/2007 |

(Continued)

*Primary Examiner* — David S Warren
(74) *Attorney, Agent, or Firm* — Bressler, Amery and Ross; Pierre R. Yanney (57) ABSTRACT

A destination call, as an example of an action, is automatically generated in an elevator system when detected current connection data correspond to a stored behavior pattern for the usage of the elevator system. A communicative link between a sensor in a sensor system that comprises a multitude of sensors and the mobile electronic device of a passenger is detected, and connection data about the communicative link are recorded. The connection data are compared with data stored in a memory device containing at least one behavior pattern in order to determine whether the connection data correspond to a stored behavior pattern.

16 Claims, 4 Drawing Sheets

(56) References Cited

U.S. PATENT DOCUMENTS

| | | | |
|---|---|---|---|
| 2007/0026802 A1* | 2/2007 | Gerstenkorn | B66B 1/468 |
| | | | 455/41.2 |
| 2011/0259674 A1* | 10/2011 | Silberhorn | B66B 5/0031 |
| | | | 187/247 |
| 2013/0245832 A1* | 9/2013 | Blom | H04W 4/029 |
| | | | 700/275 |
| 2013/0271152 A1* | 10/2013 | Kattainen | G05B 15/02 |
| | | | 324/537 |
| 2014/0231184 A1* | 8/2014 | Kappeler | B66B 1/468 |
| | | | 187/380 |
| 2016/0185570 A1* | 6/2016 | Kattainen | G05B 15/02 |
| | | | 700/275 |
| 2018/0162688 A1* | 6/2018 | Troesch | B66B 1/468 |
| 2019/0012887 A1* | 1/2019 | Troesch | G08B 27/006 |
| 2019/0225457 A1* | 7/2019 | Koivisto | H04W 4/33 |

FOREIGN PATENT DOCUMENTS

| | | |
|---|---|---|
| EP | 2604562 A2 | 6/2013 |
| EP | 2695839 A1 | 2/2014 |
| WO | 00/75062 A1 | 12/2000 |
| WO | 2014049201 A1 | 4/2014 |
| WO | 2014/096529 A1 | 6/2014 |
| WO | 2014195564 A1 | 12/2014 |

* cited by examiner

LIFT SYSTEM WITH PREDICTIVE CALL PRODUCTION

CROSS-REFERENCE TO RELATED APPLICATIONS

This application is the national phase application under 35 U.S.C. § 371 claiming the benefit of priority based on International Patent Application No. PCT/EP2016/063212, filed on Jun. 9, 2016, which claims the benefit of priority based on European Patent Application No. 15172971.3, filed on Jun. 10, 2015. The contents of each of these applications are herein incorporated by reference.

FIELD OF THE INVENTION

The technology described here generally relates to a system comprising an elevator system that has a control system for generating a call. Embodiments of the technology additionally relate to a method for generating a call.

BACKGROUND OF THE INVENTION

Elevator systems are known such that they have either a floor repeater terminal for entering the desired direction (e.g. "up" and "down" buttons) or a floor repeater terminal for entering the desired destination floor, so that a passenger can call an elevator. The latter allows for elevator systems with destination call control. Supporting a passenger in the entry of a call is also known. For example, WO 2014/049201 A1 describes an elevator system which operates on a self-learning basis to update a favorites list for a passenger. The favorites list contains the destination floors most often selected by a passenger within a period of time. If the system identifies a passenger before the actual entry of a call, the system presents the favorites list to said passenger when passenger is to select a destination. WO 2014/096529 A1 describes an elevator system in which the elevator car is automatically called to a floor when a person leaves his or her apartment on that floor. For this purpose, a sensor is associated with the apartment to determine when a person leaves the apartment.

The stated solutions are based on different approaches to supporting a passenger during the entry of a call. There is a need for an improved way to support a passenger when entering a call.

SUMMARY OF THE INVENTION

One aspect of this type of improved technology relates to a method for generating an action in a building with at least one door and one elevator system with an elevator car, which can be displaced between the floors of a building. A communicative link between a sensor in a sensor system comprising a multitude of sensors and a passenger's mobile electronic device is detected and connection data about the communicative link are recorded. The connection data are compared with data stored in a memory device in order to determine whether the connection data correspond to a stored behavior pattern. If the connection data correspond to a stored behavior pattern, the action is generated.

Another aspect relates to a system with an elevator system in which an elevator car can be moved between floors of a building. The system has a sensor system with a plurality of sensors that are arranged in specified locations in the building, wherein a communicative link is established between one of the sensors and a passenger's mobile electronic device when the mobile electronic device is within the radio range of the sensor. The system additionally has an evaluator that detects the communicative link between the sensor and the mobile electronic device, records connection data of the communicative link and compares the connection data with data stored in a memory device containing at least one behavior pattern in order to determine whether the connection data correspond to a stored behavior pattern. The evaluator generates an action if the connection data correspond to a stored behavior pattern.

The generated action can be adapted to different situations. In one embodiment, the action includes a destination call, which is generated when the connection data correspond to a stored behavior pattern for the use of the elevator system, wherein the destination call defines a boarding floor and a destination floor, and wherein said destination floor is established in this behavior pattern. In one embodiment, the action includes an unlock command for a door of the building, which is generated when the connection data correspond to a stored behavior pattern that is required to unlock a door.

In the embodiments described here, a current behavior of a passenger is compared with stored behavior patterns, which are derived from the passenger's behavior in the past. If the current behavior matches a behavior pattern that involves an elevator journey from a boarding floor to a destination floor, for example, then a specific destination call will be generated for this passenger automatically and without any further action by the passenger. In this way, the expected behavior of the passenger can be predicted based on the correspondence between the current behavior and the behavior in the past.

However, the technology also supports the passenger in the entry of a destination when a comparison of the current behavior and the behavior patterns does not yield a clear correspondence. In such a case, the passenger can be presented with one or more proposed destinations on a mobile device carried by the passenger (e.g. smartphone). Multiple proposed destinations can be presented in a ranking list, which can be arranged in descending order of correspondence. The passenger can select a proposed destination from the list, whereupon a corresponding destination call is generated.

Based on the comparison, the technology also recognizes when the passenger tends not to want to use the elevator. This prevents proposed destinations from being displayed or destination calls from being generated unnecessarily when, for instance, it is highly probable that the passenger will not want to use the elevator because of his or her current location or direction of movement.

The technology offers flexibility with regard to storing the connection data, including the behavior patterns derived from it. For example, for the purposes of data protection these data can be stored exclusively in the passenger's own mobile device. The data are read out for processing, e.g. by the control device; they are not stored there beyond the time required for processing, though. Alternatively, the data can also be processed by means of appropriate software applications in the mobile device. The mobile device then transmits the results of this processing, e.g. a destination call, to the elevator system. In another embodiment, such as one in which there are no concerns regarding data protection, the data can also be stored in a memory device of the elevator system or a building management system. The data is then processed in the control system of the elevator system, for example.

This technology also offers flexibility in terms of recognizing the connection data. For example, the connection data can be recognized by the control system of the elevator system. In one embodiment, the control system is networked with sensors for this purpose, and when a communicative link is established with the mobile device, each of the sensors generates a sensor signal that is received e.g. by the control system. Since the location within the building of each sensor is known, it is possible utilize the sensor signal to draw a conclusion about the whereabouts of the mobile device. If considerations of data protection make it undesirable for the control system of the elevator system to detect movements, it is possible in another embodiment to perform the detection using the mobile device without involving the control system. For this purpose, non-networked radio sensors, such as Bluetooth beacons, are arranged in the building, each of which communicates with the mobile device as soon as it is within range of a radio sensor. The location of the mobile device is thus always determined by means of the mobile device.

BRIEF DESCRIPTION OF THE DRAWINGS

Various aspects of the improved technology are described in greater detail below on the basis of embodiments in conjunction with the drawings. In the drawings, identical elements have identical reference signs. The following is shown.

DETAILED DESCRIPTION OF EMBODIMENTS OF THE INVENTION

Figure 1:
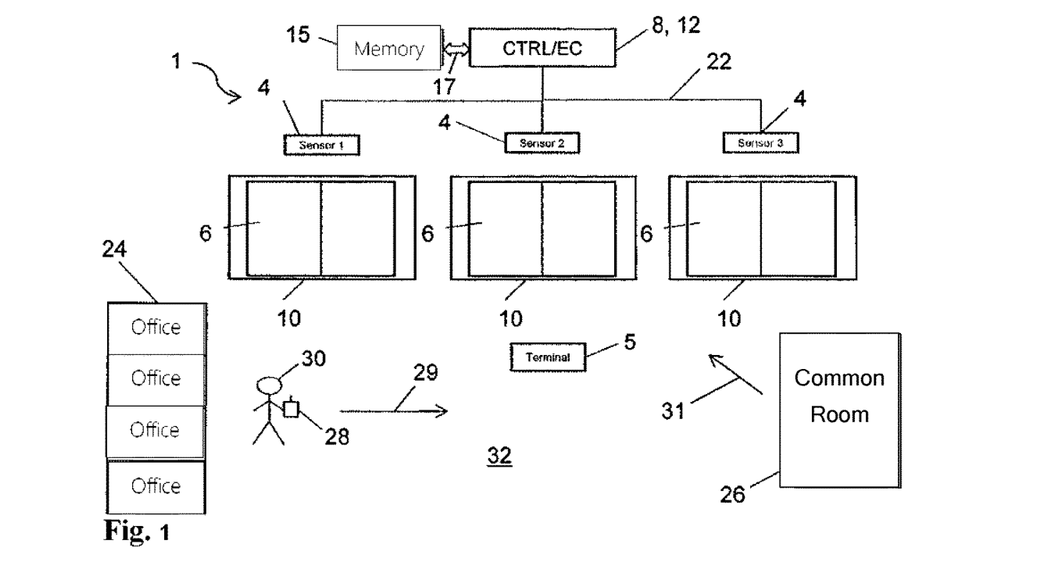
FIG. 1 a schematic representation of a exemplary situation on a floor of a building that is served by an elevator system with automatic call entry.

FIG. 1 is a schematic representation of a exemplary situation on a floor of a building 2 that is served by an elevator system 1 with automatic call entry. In this representation, it is a floor with 24 offices (office), one common room 26 (common facility), an anteroom 32, in which a passenger 30 with the passenger's own mobile device 28 can move, and a floor repeater terminal 5, which is disposed in the anteroom 32. The term "passenger" should be generally understood here to be a person who spends time in the building 2, regardless of whether he or she uses the elevator system 1. It shall be understood that the building 2 can basically be any type of multi-story building (e.g. apartment buildings, hotels) or a ship.

According to a first embodiment, the elevator system 1 is represented by three elevator cars 10, each having an elevator door 6, and an exemplary sensor system comprising three sensors 4. The sensor system is linked to a control system 8, 12 by a cable 22. Each of the sensors 4 in this embodiment is assigned to an elevator car 10, e.g. arranged above or next to the respective elevator car 10. However, a person skilled in the art recognizes that assigning them to the elevator cars 10 is not necessary and is optional and that the sensors 4—in addition or alternatively to the sensors 4 that are assigned to the elevator cars 10—can also be arranged in other places (e.g. in the offices 23 or in the common room 26, on the doors of the offices and/or floors (e.g. on the door locks) or on stair access doors). Similarly, more or fewer sensors 4 can be provided on each floor.

The sensors 4, which are networked with the control system 8, 12 by a cable 22, each have an individual identifier in the network. The identifier identifies a sensor 4 in the network, and a fixed location (installation site) in the building 2 is associated with it. Using the identifier of the sensor 4, information about the location of the sensor 4 can be transmitted. This information comprises, for example, the floor, details about the location on the floor (e.g. above an elevator car 10) and/or data about any provided and possibly adjacent sensors 4 on the same floor.

The sensors 4 are based on a known radio technology, such as RFID, NFC, WiFi or Bluetooth; the latter is described in greater detail below. In one embodiment, the control system 8, 12 records a communicative (radio) link between a sensor 4 and the mobile device 28.

In a second embodiment of the sensor system, the sensors 4 are not linked with the control system 8, 12, and so the cable 22 can be omitted. Sensors 4 of this type are provided e.g. with beacons equipped with Bluetooth technology. A beacon 4 thus hereafter referred to as a "beacon 4" or a "Bluetooth beacon 4". Communication between the mobile device 28 (smartphone), which is Bluetooth-enabled, and the beacons 4 thus takes place in accordance with a version of a Bluetooth standard, e.g. Bluetooth standard 4.0 (Bluetooth Low Energy (BLE)).

According to one version of the Bluetooth standard, a first communicative contact (i.e. a so-called pairing) occurs between the mobile device 28 and a beacon 4, during which the communications partners are exchanging identification data so that they automatically recognize each other again the next time. As soon as the mobile device 28 is again within reception range of one of the beacons 4 following successful pairing (when the Bluetooth function is activated), the beacon 4 in question and the mobile device 28 automatically establish a communicative link. Accordingly, the link is interrupted when the smartphone again leaves the reception range. It is assumed hereafter that when a pairing is possible in the Bluetooth version being used the pairing was successful.

A person skilled in the art recognizes that this kind of pairing is a possibility for recognizing the communication partner, but it is not absolutely necessary. For instance, a beacon 4 can always transmit the same data, e.g. "ID=5". In this case, no pairing is required for the mobile device 28 to recognize that the beacon 4 with "ID=5" is near.

Figure 2:
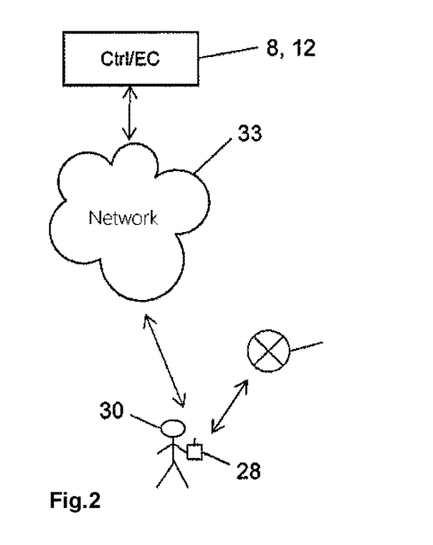
FIG. 2 a schematic illustration of exemplary communications by a mobile device.

FIG. 2 illustrates interactions of the mobile device 10 with the beacon 4 and a communications network 33. The control system 8, 12 is coupled to the communications network 33 in the embodiment shown. In this embodiment, each beacon 4 stores an individual identifier (ID), which is transmitted to the mobile device 28 via a communicative link. The mobile device 28 transmits the identifier of a beacon 4 to a database, in which the identifier is linked with data about a location at which said beacon 4 is arranged. The database can be in the control system 8, 12 or in another storage system 15. The transmission to the database can occur via the communications network 33 (e.g. WLAN, internet), during which an identification parameter (e.g. telephone number and/or device ID code (media access control) (MAC) address)) of the mobile device 28 is transmitted. Depending on the configuration, the control system 8, 12 or the mobile device 28 can access the database to determine the location data of this beacon 4.

By accessing the database, the control system 8, 12 can identify which mobile device 28 is located near the location of the beacon 4. If the passenger 30 moves within the building 2, the described process repeats as soon as a communicative link is established between the mobile device 28 and a different beacon 4. This permits the control system 8, 12 to track the movement of the mobile device 28.

In one embodiment, a software application (app) is installed on the mobile device 28 to support communication with the beacons 4 and the control system 8, 12 that is coupled to the communications network 33. Authorized persons (e.g. regular users of the building 2) can pre-install the app on their mobile device 28. A visitor can be offered the app to download on his or her mobile device 28 when entering the building 2.

Figure 3:
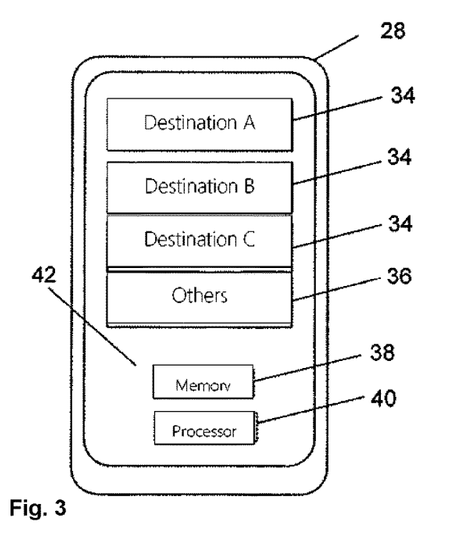
FIG. 3 a schematic representation of a mobile device displaying various selection fields.

FIG. 3 illustrates a smartphone as an example of a mobile device 28. A memory device 38 (memory) and a processor 40 are provided within it. Since they are located under a display 42 (touch screen), they are not visible from the outside and are therefore indicated with a dotted line. The passenger 30 can use the display 42 to individually adapt settings and desired functions on the mobile device 28. For example, the Bluetooth function can be activated and deactivated; the latter when the passenger 30 wishes to protect his or her privacy, for instance, because movements within the building 2 cannot be tracked without the Bluetooth function. Moreover, the passenger 30 can activate and deactivate the aforementioned app.

The app also controls the display 42, by means of which information is provided to the passenger 30. The information can be represented on the display in a readable form, i.e. as text and/or a symbol. Additionally or alternatively, the information can also be presented to the passenger 30 acoustically, and so e.g. people with limited vision can also receive the information and react accordingly. In the embodiment represented, the display 42 shows various destination selection boxes 34, 36. The functions of the destination selection boxes 34, 36 are described below.

The embodiment described here, the passenger 30 is an employee and, as such, is recorded in a database as an authorized elevator user. For each registered passenger, a user profile is saved in a database and contains e.g. personal data (e.g. name, company, possibly physical handicaps, identification data for a mobile device 28 (e.g. ID code (media access control (MAC) address)), identification data for an employee identity card (badge) with RFID technology or an optical code (e.g. barcode) and/or person-specific access and/or usage authorizations (e.g. access only on work days between the times of 7:00 and 18:00). The database is implemented in a data memory, which can be a component of the elevator system 1, a building management system or another system (e.g. a spatially remote data storage system). If the database is a component of the building management system or the spatially remote data storage system, the control system 8, 12 of the elevator system 1 has access to the database in order to verify e.g. usage and access authorizations before a call is serviced. The database can be administered, for example, by a building manager or another service provider.

In one embodiment, the control system 8, 12 detects and records each communicative link between the mobile device 28 carried by the passenger 30 and the sensor 4 networked by means of the cable 22. In an embodiment with beacons 4, the mobile device 28 detects and records each communicative link with one of the beacons 4 alone and without the involvement of the control system 8, 12.

Regardless of which unit (control system 8, 12 or mobile device 28) detects the individual communicative links, the associated connection data are stored in a memory device 15, 38 (see FIG. 2). In one embodiment, these connection data are stored separately from the user profiles in the aforementioned database. The memory device 15 shown in FIG. 1 is communicatively linked with the control system 8, 12 via a connection 17 and can be a component of the elevator system 1, a building management system or a spatially remote data storage system. The memory device 38 in FIG. 2 in combination with FIG. 3 is a component of the mobile device 28. The stored connection data can include: ID code of the mobile device 28 associated with the passenger 30, date, start and end (times, durations) of the communicative link, identifier and location of the sensor 4, or signal strength.

If the passenger 30 moves toward the common room 26, for example, as is indicated by an arrow 29 in FIG. 1, links are established with three sensors 4; first with "sensor 1," then with "sensor 2" and finally with "sensor 3". If the passenger 30 later returns to his or her office 24, the links with the sensors 4 occur in the reverse order. Based on the temporal sequence of the individual communicative links, it is possible to determine e.g. the path of movement on the floor of the building.

However, it is also possible that the passenger 30 calls an elevator after visiting the common room 26 (indicated by an arrow 31) in order to travel to a particular floor, such as to the floor where the restaurant is located at lunch time and to the parking level or lobby at the end of the word day. For this type of passenger 30 behavior, not only the connection data (see above) but also the data relating to the use of the elevator system 1 are determined. The data regarding usage of the elevator system 1 are available in the control system 8, 12, and it provides them for further processing.

If these processes repeat, e.g. every day at particular times, then it is possible to derive one or more behavior patterns therefrom. One group of behavior patterns encompasses behavior patterns in which the passenger 30 uses the elevator system 1 to travel to a particular destination floor. A different group of behavior patterns encompasses behavior patterns in which the passenger 30 moves on the floor but does not use the elevator system 1. Behaviors by the passenger 30 that occur only occasionally cannot be classified to any behavior pattern. In the case of this type of behavior, one or more communicative links can be established (e.g. close to the stairwell), from which it is possible to conclude that the passenger does not tend to want to use the elevator system 1.

In one embodiment, the control system 8, 12 reads out the data stored in the memory device 15 (connection data, data about elevator usage) and performs a statistical evaluation. Based on the evaluation, it is possible to determine, for instance, whether the behavior of the passenger 30 follows a particular behavior pattern (e.g. the passenger 30 goes from the office 24 to the common room 26 every day at 8:00 and then around 8:15 travels to the floor where management is located). A recognized behavior pattern is identified as such and is stored. The statistical evaluation can be carried out according to a fixed schedule (e.g. once a day) or after any change in a data set. A change in the data set occurs after every detected communicative link if the connection data that were produced by it are saved.

To perform the statistical evaluation, the control system 8, 12 has a processor, which evaluates the data with an appropriate algorithm. In one embodiment, the algorithm is implemented as statistics and analysis software, either as an individually developed application or as a commercially available software product, e.g. the statistics software IBM SPSS Statistics.

Depending on the configuration, the data produced as a result of the evaluation, in particular the recognized behavior pattern(s) (movement and usage patterns) are stored in a memory device. As is explained above, the memory device can be a component of the elevator system 1 (memory device 15), the building management system, a spatially remote data storage system or the mobile device 28 (memory device 38). For reasons of data security, especially to protect the privacy of the passenger 30, it could be desired or required that personal data remain in the control of the passenger 30 and be stored, for example, only in the memory device 38 on the passengers mobile device 28. The control system 8, 12 can access these data in order to process them and generate a destination call in accordance with a recognized behavior pattern; the data are not stored outside of the mobile device 28, however.

Figure 4:
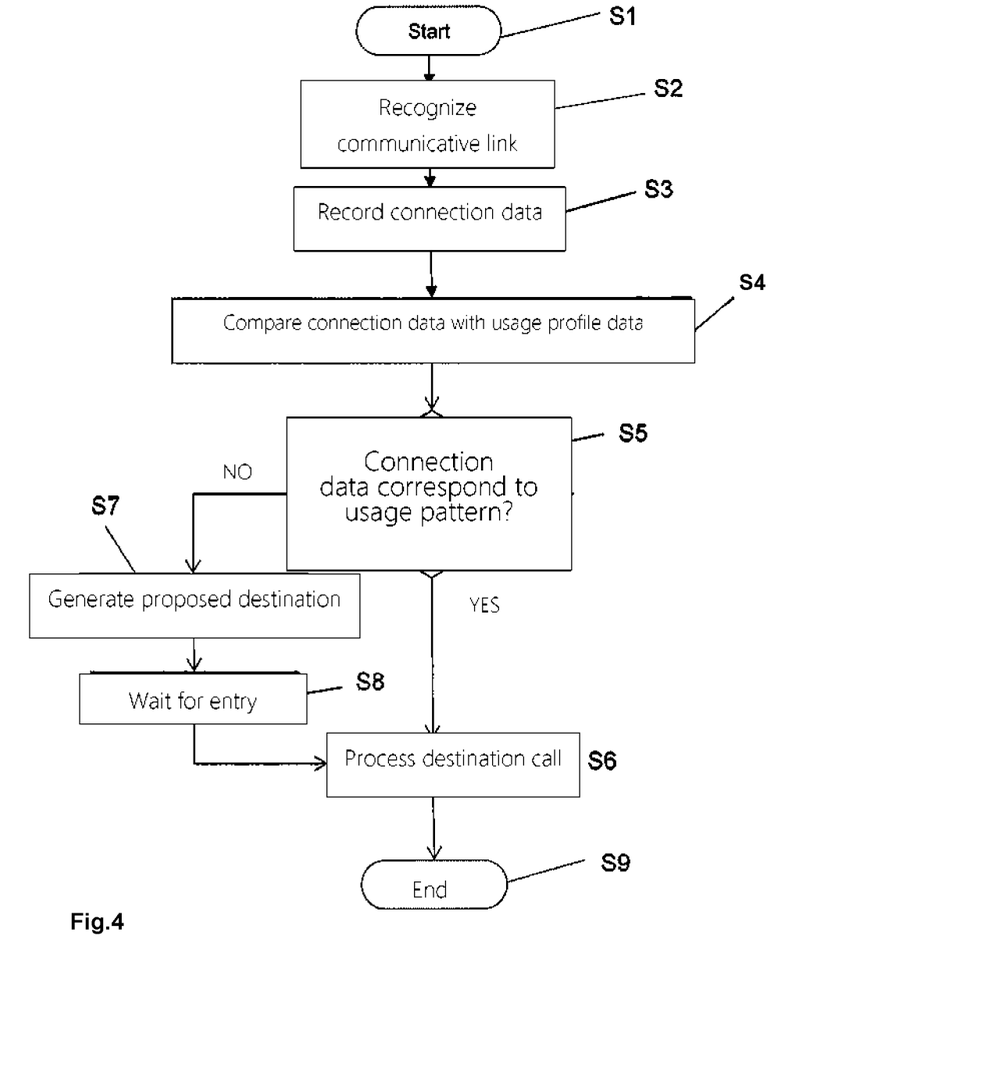
FIG. 4 an exemplary representation of a method for generating a destination call based on a schematic flow chart.

With an understanding of the principle structure and functionalities of the building 2 and the elevator system 1 described in FIG. 1-FIG. 3, what follows now is a description of embodiments of a method for operating the elevator system 1, especially a method for generating a destination call, in conjunction with FIG. 4. Further structural details of the elevator system 1 are described below in connection with FIG. 5.

FIG. 4 shows an exemplary flow chart of a method for generating a destination call in the elevator system 1. Here it is assumed once again that the mobile device 28 is a smartphone, which the passenger 30 carries on a floor of the building 2 according to the situation shown as an example in FIG. 1, and that a first communicative link (i.e. the pairing) between the smartphone and the sensors 4 of the sensor system has already occurred. As is discussed above, pairing such as this is not required. Moreover, it is assumed that the connection and usage data stored in the memory device 15, 38 and any behavior patterns contained therein were recognized and identified and stored as such. The memory device 15, 38 that is used depends e.g. upon the aforementioned preferences and specifications regarding data protection. Accordingly, one or more steps of the method can be carried out in the control system 8, 12 or in the mobile device 28. The method according to FIG. 3 begins in a step S1 and ends in a step S9.

In a step S2, a communicative link between a sensor 4 and the mobile device 28 is recognized. If the sensors 4 are networked with each other via the cable 22 shown in FIG. 1, then the control system 8, 12 receives a signal from the sensor 4 that is involved in the communicative link. Which sensor 4 is involved and where said sensor 4 is located also become known in this way. If the sensor 4 is a Bluetooth beacon, the mobile device 28 reads out the ID (identifier) of said beacon during the communicative link. It does not necessarily require a pairing to do so. The ID (identifier) is then used to identify the location of the beacon with this ID (identifier) in the database. Depending on the configuration, the reading of the ID or access to the database reveals the existence of a communicative link.

In a step S3, connection data about the communicative link between a sensor 4 and the mobile device 28 are recorded. For each communicative link, connection data are generated by which it is possible to determine, for example, which mobile device 28 and which sensor 4 are involved, where the communicative link occurs (floor, location on the floor) and how long it lasts. In the situation shown in FIG. 1, multiple communicative links occur as the passenger 30 moves from the office 24 to the common room 26. Afterward, the passenger 30 can call an elevator, e.g. using the floor repeater terminal 5 or the mobile device 28. If the passenger 30 regularly travels this path at a particular time, this could correspond to an exemplary behavior pattern.

In a step S4, the connection data from step S3 are compared with data stored in the memory device 15, 38. The comparison makes it possible to recognize whether and with what probability (percentage) the connection data correspond to a behavior pattern.

If it is determined in step S5 that the connection data correspond to a particular behavior pattern, according to which the passenger 30 would like to travel with an elevator to a floor, the appropriate destination call is derived from this. The connection data correspond to a known behavior pattern when the probability determined in step S4 exceeds an established threshold value (e.g. 90%). The destination floor is established in this behavior pattern, and the boarding floor is determined from the floor on which the sensor 4 is arranged. The definition of the destination call occurs automatically and without any further action by the passenger 30. The method then proceeds along the YES branch to a step S6.

In step S6, the destination call is sent to the control system 8, 12 and is processed by it. The control system 8, 12 processes this destination call using an allocation algorithm and it allocates an elevator car 10 to the destination call to service said destination call. The method ends in step S9 with the allocation of the elevator car 10.

On the other hand, if it is determined in step S5 that the connection data do not correspond to a known behavior pattern, the method in the embodiment shown proceeds along the NO branch to a step S7. In step S7, at least one proposed destination is generated, which could correspond to a best match between the (current) connection data and a stored behavior pattern. Depending on whether one or more proposed destinations are generated, the proposed destinations can be arranged in a ranking list on a display 42 of the smartphone. In FIG. 2, three proposed destinations (destination A, destination B, destination C) are assigned to the destination selection boxes 34, from which the passenger 30 can choose.

In one embodiment, a software application (app) is installed on the mobile device 28 to control the display 42 accordingly. Depending on the configuration, the software application can determine the proposed destinations itself (i.e. the evaluation of the connection data occurs in the mobile device 28) or corresponding control commands are received by the control system 8, 12 to subsequently control the display 42.

If an entry is made in step S8 in which the passenger 30 touches one of the destination selection boxes 34, then a destination call corresponding to the entry is defined. The destination call is processed as described above in connection with step S6.

If the passenger 30 does not wish to travel to any of the proposed destinations, the information on the display can be changed using the destination selection box 36 (Other). For instance, a number keyboard can be displayed, with which the passenger 30 can directly enter the desired destination floor. However, it is also possible to display a message that prompts the passenger 30 to enter the destination floor on the floor repeater terminal 5 shown in FIG. 1.

In the embodiment described here, the proposed destination generated in step S7 corresponds to a best match between the (current) connection data and a stored behavior pattern. In another embodiment, the passenger 30 can pre-define desired destinations himself or herself. Additionally, the aforementioned software application (app) installed on the mobile device 28 is used in one embodiment. Using said app, the passenger 30 enters the desired destination(s) and associated transport conditions. These transport conditions can include calendar days, times of day and/or transport parameters. The passenger 30 can thus establish, for example, that an elevator journey to the 5th floor is desired when a communicative link is established between a sensor 4 in the lobby and the mobile device 28 on a work day (Monday through Friday) morning between 7:00 and 9:00. At the stated times, this corresponds to a desire to travel from the lobby to the 5th floor. At other times, a different floor can be set as the destination. Multiple destinations can be defined in a similar way. If the transport condition is satisfied, a corresponding destination call is automatically generated.

To support the passenger 30 in establishing the destinations and transport conditions, the software application shows a graphical user interface on the display 42, which can be structured e.g. as follows:

| <BACK | | STORE> |
|---|---|---|
| From | | Lobby> |
| To | | 5th floor> |
| Time frame | From: 07:00> | Until: 09:00> |
| Days | From: Monday> | Until: Friday> |

By pressing the enter and selection boxes (represented by the symbol ">"), the passenger 30 can establish the starting floor, the time frame and the days on which the transport conditions should be valid. If all entries are actuated, the passenger 30 can activate or deactivate the self-defined destination function. The passenger 30 can thus choose these settings in a way that is known e.g. from the setting of a wake-up time (alarm) and its activation or deactivation on a smartphone.

A person skilled in the art recognizes that further conditions can also be established in a similar way. For example, it can be defined that a particular door is unlocked when a communicative link is established between a sensor 4 in the lobby and the mobile device 28 on an established day and within an established time frame. On another day and/or outside of the time frame, the door remains locked. Pre-defining a door condition such as this facilitates the movement of the passenger 30 within the building 2.

Furthermore, a person skilled in the art recognizes that the technology described here can be modified in other embodiments such that, in addition to or instead of producing a destination call, it is possible to generate commands to unlock a door (e.g. door lock) of the building 2 or a room. In this case, as well, the system uses the sensors 4 to recognize where the passenger 30 is located and how he or she is moving in the building 2, and it applies behavior patterns accordingly. The system thus recognizes whether the passenger 30 would like to go from one room to the next and unlocks the appropriate doors.

In one embodiment, the software application performs a plausibility check, which examines the defined destinations for possible conflicts. An example of a conflict could be that the passenger 30 is attempting to establish multiple different destinations for the time frame between 7:00 and 9:00. In such a case, it would not be clear which destination the elevator system 1 should service. The software application can inform the passenger 30 of this type of conflict and, for example, request that the time frame be changed.

Depending on the configuration and available performance features of the software application, the software application can permit the passenger 30 to pre-define absences (e.g. "vacation from/to") and/or additional conditions (e.g. "If alone, then action A" or "If accompanied by a colleague, then action B").

The possibility of allowing the passenger 30 to pre-define desired destinations and conditions can also be useful when a sufficient database is not yet available to recognize movement patterns from statistical evaluations. Once the passenger 30 has established destinations and conditions, the operation of the elevator system 1 and the movement within the building 2 will become more comfortable, even if no movement patterns have been recognized yet.

Apart from the stated conditions, the passenger 30 can also use the software application to establish individual basic settings. These can include the floor on which the office of the passenger 30 is located or the parking level on which the passenger 30 usually parks his or her vehicle. A further basic setting relates to the statistical evaluation of the connection data. For instance, the passenger 30 can set the threshold value for probability determined in step S4.

As is explained above, the sensor system with its sensors 4 distributed in the building 2 serves to recognize the whereabouts of the passenger 30 within the building 2, from which the stated movement patterns are derived as a function of time. The servicing of the elevator system 1 is thereby facilitated. It is possible, however, that the passenger 30 does not wish to use this functionality and the associated "tracking" of his or her movements. In that case, the passenger 30 can deactivate the tracking function using the software application, for example by entering a deactivation command. As a result, at least the statistical evaluation is not carried out; depending on the configuration, the derivation of movement patterns and the automatic generation of a destination call may also be omitted. The Bluetooth function of the mobile device 28 is thereby not deactivated, and so communicative links between the mobile device 28 and the sensors 4 continue to be established. If the passenger 30 has established destinations and conditions, as described above, then the servicing of the elevator system 1 will still be more comfortable despite the deactivation of the tracking function, since a destination call will be automatically generated e.g. when a transport condition is fulfilled.

In one embodiment, the system generates a message for the passenger 30, which is visibly and/or audibly conveyed to the passenger 30 by means of the mobile device 28. After an elevator journey or another spatial movement in the building 2 or several such activities, the system generates this message when it has a particular hypothesis regarding a usage pattern. The message can ask the passenger 30, for example, whether this usage pattern should be stored as such or whether the usage pattern is repeated on particular days and at particular times.

As is explained above, in one embodiment the system automatically generates a destination call without the involvement of the passenger 30. The system informs the passenger 30 via the mobile device 28, e.g. about the allocated elevator, so that the passenger 30 is aware of this and can get to the elevator. Since it is unknown when this will take place, the mobile device 28 can be in a locked or unlocked state. In the unlocked state, the graphical user interface appears on the display 42 and shows the number or letter of the allocated elevator. This can occur in conjunction with an audible notification. In the locked state, the display 42 in one embodiment shows a message that is also presented as a voice message. If the passenger 30 is carrying the mobile device 28 in a pocket where it is not visible, for example, the voice message can nevertheless be heard.

Figure 4A:
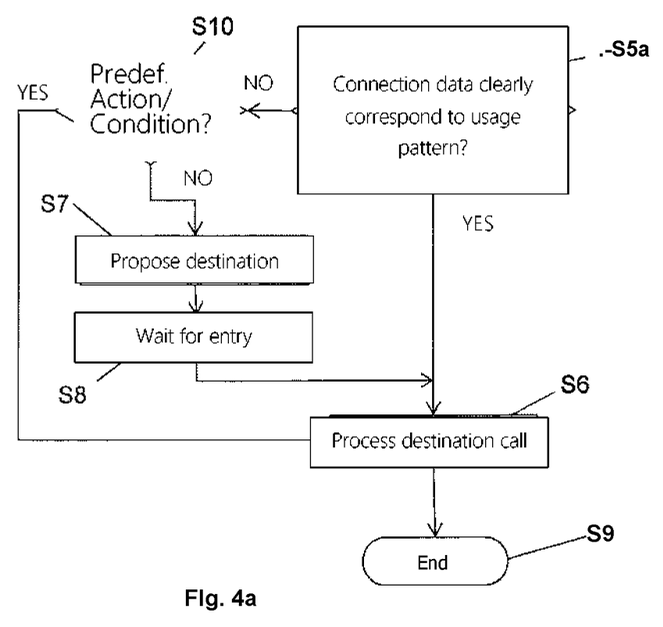
FIG. 4a an exemplary representation of a variant of a method for generating a destination call based on a schematic flow chart.

The method illustrated in FIG. 4 can be modified to take into consideration the embodiments described above with regard to pre-defined actions, conditions, basic settings and undesired tracking functions. FIG. 4a shows an exemplary representation of a variant of the method described in FIG. 4. To avoid repetitions, steps S1-S4 are not shown in FIG. 4a; it is understood that they are carried out, though. Moreover, FIG. 4a shows a step S5a, which an be considered a modified step S5 according to FIG. 4.

It is verified in step S5a whether the connection data clearly correspond to a known behavior pattern. The connection data clearly correspond to a known behavior pattern when the probability determined in step S4 exceeds a threshold value established e.g. by the passenger 30. If this is the case, the method proceeds along the YES Branch to step S6, as described above. If this is not the case, for instance because the database is insufficient for a statistical evaluation or because the tracking function is deactivated, the method proceeds along the NO branch to a step S10.

In step S10, it is verified whether the passenger 30 has pre-defined actions and/or conditions by means of the mobile device 28. For example, it can be defined that the passenger 30 always wishes to travel to the 5th floor when the sensor system recognizes the mobile device 28 in the lobby on a Monday, otherwise to the 10th floor. Further possibilities and their definitions with the aid of the software application are explained above.

If pre-defined actions and conditions are available in step S10 and if they apply to the current connection data, then the method proceeds along the YES branch to step S6, in which the appropriate destination call is processed. In the other case, i.e. if there are no pre-defined actions and conditions or they do not apply to the current connection data, then the method proceeds along the NO branch to step S7, in which one or more proposed destinations are generated, for example.

The variant shown in FIG. 4a thus takes into consideration that the statistical evaluation of the connection data and the recognition of a behavior pattern (e.g. when there is an insufficient database) are improved or can be completely or partially replaced (e.g. when the tracking function is deactivated) by the stated pre-definitions made by the passenger 30. If the database is insufficient, a defined time frame can improve the statistical evaluation, for example. On the other hand, a statistical evaluation can be replaced by a pre-defined action.

Figure 5:
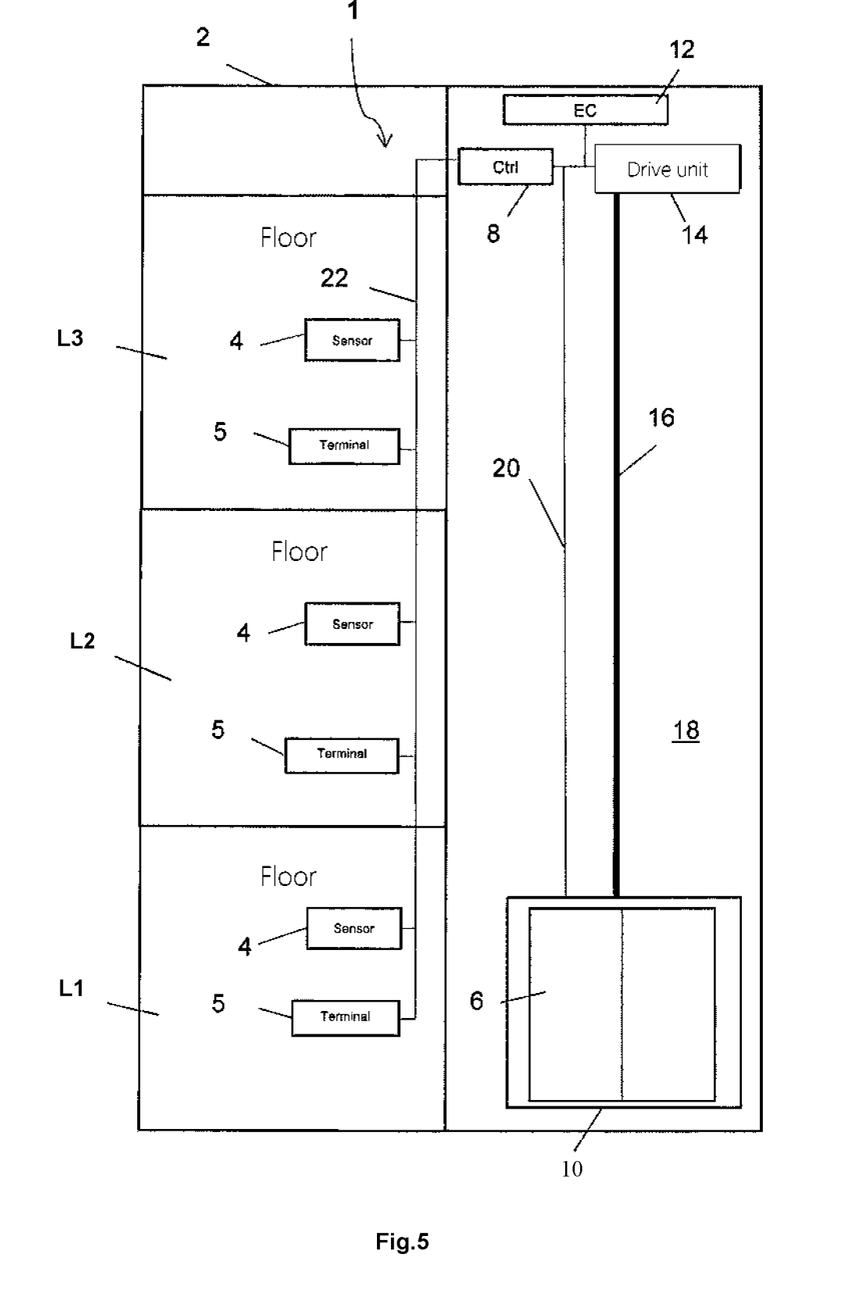
FIG. 5 a schematic representation of an embodiment of the elevator system in a building shown in a side view.

Further components and functions of the elevator system 1 will be explained below in connection with FIG. 5, insofar as they seem helpful to understanding the technology described here. FIG. 1 shows a representation of one embodiment of the elevator system 1 in a side view of the schematically illustrated building 2. The building 2 has multiple floors L1, L2, L3 that are served by the elevator system 1, i.e. a passenger can be conveyed from a boarding floor to a destination floor by the elevator system 1. The elevator system 1 can be configured differently depending on the building 2, e.g. as a traction elevator with cables or belts, as a hydraulic elevator, as an elevator with multi-compartment cars, or as a group of multiple elevators (e.g. a group of three elevators as shown in FIG. 1, wherein each has one elevator car 10 (per shaft)). In the embodiment shown, the elevator system 1 has an elevator car 10 that can be displaced in an elevator shaft 18 and that is connected to a drive unit (drive) 14 by a bearing means 16 (cable or belt) and is suspended from this drive unit 14. It could be a traction elevator, although further details, such as a counterweight and guide rails, are not shown in FIG. 1. The elevator control (EC) 12 is linked with the drive unit 14 and activates the drive unit 14 to displace the elevator car 10 in the shaft 18. A person skilled in the art is generally familiar with how a traction elevator functions and the tasks of an elevator control 12.

The elevator system 1 shown in FIG. 4 is equipped with a destination call controller, and so the destination call generated in step S6 in FIG. 3 can be processed in a known way. The function of the destination call controller in the embodiment shown are implemented in the control device (Ctrl) 8, but it can also be implemented entirely or partially in the elevator control 12. The control device 8 and the elevator control 12 can be combined into a control system (8, 12).

Although the control system (8, 12) according to one of the embodiments described here can automatically generate a person-specific destination call, in one embodiment a plurality of floor repeater terminals 5 can be considered entry terminals for entering destination calls. These floor repeater terminals 5 allow an unregistered passenger or a visitor without a mobile device to enter a destination call, for example; however, they also permit a registered passenger 30 to enter a destination call that deviates from the normal usage behavior, e.g. including when none of the proposed destinations corresponds to the passenger's 30 current desired destination. As is explained above, the passenger 30 can also use the mobile device 28. The floor repeater terminals 5 are communicatively linked with the control device 8 via the cable 22. The building 2 in the embodiment shown has three floors L1, L2, L3, and a floor repeater terminal 5 is present on each floor. It is also possible for there to be only two or more than three floors; additionally, more than one floor repeater terminal 5 can be provided on one floor L1, L2, L3.

The control device 8 is communicatively linked with the elevator control 12 as described above. A communicative link in the present description is understood to be a direct or indirect connection that permits unidirectional or bidirectional communication between two units. Data signals and/or control signals are thereby transmitted in a way that is known per se. This kind of link can be established by an electric cable system (either as a system of point-to-point links or as a bus system, wherein the units connected to the bus system are addressable), a radio system or a combination of a radio system and a cable system. FIG. 5 shows an example of the communicative link via cables 20, 22, wherein cable 20 extends between the control device 8 and the car 10, and cable 22 links the floor repeater terminals 5 with the control device 8. In one embodiment, the cable 22 can be a bus system to which the floor repeater terminals 5 are connected. Similarly, cable 20 can also be a bus system.

In another embodiment, at least one floor repeater terminal 5 can be communicatively linked with the control device 8 via a radio system. In a further embodiment, the mobile electronic device 28 (e.g. mobile telephone, smartphone, smartwatch, table PC) can be used instead of a floor repeater terminal 5 to enter a destination call. The display 42 of the mobile device 28 shown in FIG. 3 can also receive a message (e.g. "elevator A") about the elevator allocated to this destination call. For wireless communication with the elevator system 1, the mobile electronic device has a radio module, such as a Bluetooth, RFID and/or NFC module.

A person skilled in the art recognizes that the control device 8 and its functionality can also be part of the elevator control 12 or a floor repeater terminal 5. In that case, the separate representation of the control device 8 in FIG. 5 could be omitted. If the control device 8 and its functionality are integrated into the elevator control 12, then said elevator control 12 represents the control system. Therefore, the implementation of the communicative link also changes depending on the configuration. FIG. 5 should thus be considered a basic representations of an embodiment.

In one embodiment, a floor repeater terminal 5 is arranged on every floor L1, L2, L3, such as in the vicinity of the entrance to an elevator car 10. In one embodiment, the floor repeater terminal 5 comprises a keyboard or a touch-sensitive screen (touchscreen) so that a passenger can enter a destination floor. In another embodiment, the floor repeater terminal 5 comprises a device for recognizing an authorization parameter assigned to a passenger. In one embodiment, this device is a scanner for an information carrier borne by a passenger. When the passenger presents the information carrier to the scanner, the scanner reads information from the information carrier, which serves e.g. to recognize a user authorization. Only when the passenger is authorized to use the entry terminal 5 can said passenger make an entry. Depending on the configuration, the scanned information can trigger a destination call without any further involvement of the passenger.

In one embodiment, the information carrier is configured to be card-like, such as in the form of a credit card or an employee badge. Depending on the configuration, an externally contactable memory chip, an RFID transponder in conjunction with a memory chip or a code that can be optically scanned externally, such as a QR code or barcode, is located in or on the information carrier. Alternatively, the functions of the information carrier can also be implemented on a portable electronic device (e.g. mobile telephone or smartphone). QR codes, barcodes or color pattern codes can be shown on the displays of these devices. Devices of this type also permit a radio link with other electronic devices, e.g. using known radio technologies like Bluetooth or NFC. Of course, the scanner in the floor repeater terminal 5 is compatible with the technology used in the information carrier. Furthermore, a person skilled in the art is aware that the scanner can also be configured for more than one technology. In another embodiment, the authorization to make entries can also be granted when the passenger unlocks the floor repeater terminal 5 for an entry using a key.

What is claimed is:

1. A method for generating an action in a building having at least one door and one elevator system with an elevator car, which can be displaced between the floors of a building, comprising:
   detecting a communicative link between a sensor of a sensor system having a multitude of sensors and a mobile electronic device of a passenger, wherein said electronic device is a mobile telephone, a smartphone, a smartwatch or a tablet PC;
   recording connection data from the communicative link, wherein the connection data include a location of the sensor that is involved in the communicative link, an identifier of the mobile device and/or time data of the communicative link;
   comparing the connection data with data stored in a memory device in order to determine whether the connection data correspond to a stored behavior pattern;
   if the connection data correspond to a stored behavior pattern, the action is generated; and
   activating the mobile electronic device to inform the passenger about the action by means of a visible and/or audible notification.

2. The method according to claim 1, wherein the action includes a destination call, which is generated when the connection data correspond to a stored behavior pattern for the use of the elevator system, wherein the destination call defines a boarding floor and a destination floor, and wherein said destination floor is established in this behavior pattern.

3. The method according to claim 1, wherein the action includes an unlock command for a door of the building, which is generated when the connection data correspond to a stored behavior pattern that requires unlocking a door.

4. The method according to claim 1, further including the step of displaying at least one proposed destination when the connection data do not clearly correspond to a stored behavior pattern, wherein the proposed destination corresponds to a best match between the connection data and a stored behavior pattern.

5. The method according to claim 1, wherein it is concluded on the basis of one or more communicative links that the passenger does not tend to want to use the lift system.

6. The method according to claim 1, further including reading scanning the memory device by a control system of the elevator system, wherein the control system performs the stated comparison and the carries out the stated generation of the action.

7. The method according to claim 1, further including reading the memory device by a processor device of the mobile device, wherein the processor device performs the comparison and generates the action.

8. The method according to claim 1, wherein a series of successive communicative links is recognized, wherein the recording of the communicative links produces a behavior pattern of the mobile device.

9. The method according to claim 1, further including recognizing a deactivation command, which deactivates the recording of the communicative link between the sensor and the mobile device.

10. The method according to claim 1, further including receiving by the mobile device receives at least one desired destination, which comprises a travel destination and an associated transport condition, as defined by the passenger and that, when the transport condition is fulfilled, a corresponding destination call is generated.

11. The method according to claim 10, further including performing a plausibility check in order to recognize conflicts among multiple desired destinations that have been received.

12. The method according to claim 1, wherein the sensors are equipped with Bluetooth technology and the communicative link is a Bluetooth radio connection.

13. A system with an elevator system, wherein an elevator car can be displaced between floors of a building, wherein the system further comprises:
    a sensor system with a plurality of sensors, which are arranged in specified locations in the building, wherein a communicative link is established between one of the sensors and a mobile electronic device of a passenger when the mobile electronic device is within radio range of the sensor, wherein said electronic device is a mobile telephone, a smartphone, a smartwatch or a tablet PC, and wherein the connection data include a location of the sensor that is involved in the communicative link, an identifier of the mobile device and/or time data of the communicative link; and an evaluator that detects the communicative link between the sensor and the mobile electronic device, records connection data of the communicative link and compares the connection data with data stored in a memory device containing at least one behavior pattern in order to determine whether the connection data correspond to a stored behavior pattern, wherein the evaluator generates an action when the connection data correspond to a stored behavior pattern, and wherein the evaluator activates the mobile electronic device to inform the passenger about the action by means of a visible and/or audible notification.

14. The system according to claim 13, wherein the memory device is arranged in the elevator system, and a control system of the elevator system comprises the evaluator, wherein the evaluator is communicatively coupled with the memory device.

15. The system according to claim 13, wherein the memory device is arranged in the mobile device, and a processor device of the mobile device comprises the evaluator, wherein the processor device performs the comparison and the generates the action.

16. The system according to claim 13, wherein the action includes a destination call, which is generated when the connection data correspond to a stored behavior pattern for the use of the elevator system, wherein the destination call defines a boarding floor and a destination floor, and wherein said destination floor is established in this behavior pattern, and/or in which the action includes an unlock command for a door of the building, which is generated when the connection data correspond to a stored behavior pattern that requires unlocking a door.

* * * * *